(12) United States Patent
Braun

(10) Patent No.: US 7,216,928 B2
(45) Date of Patent: May 15, 2007

(54) ROOF ARRANGEMENT FOR A VEHICLE

(75) Inventor: Wolfgang Braun, Ebersbach (DE)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 0 days.

(21) Appl. No.: 11/235,289

(22) Filed: Sep. 27, 2005

(65) Prior Publication Data

US 2006/0082194 A1    Apr. 20, 2006

(30) Foreign Application Priority Data

Oct. 15, 2004    (DE) ...................... 10 2004 050 608

(51) Int. Cl.
    *B60J 7/00* (2006.01)
(52) U.S. Cl. .................................... 296/223
(58) Field of Classification Search ................. 296/223
    See application file for complete search history.

(56) References Cited

U.S. PATENT DOCUMENTS 6,623,070 B2 * 9/2003 Armbruster ............ 296/216.04
6,739,648 B1    5/2004 Tice et al.

FOREIGN PATENT DOCUMENTS

DE    100 46 068 A1    4/2002
DE    101 21 888 A1    11/2002
EP    1254800    *    9/2003
EP    1 389 546 A1    2/2004

OTHER PUBLICATIONS

European Search Report dated Jul. 4, 2006 including English translation (Eleven (11) pages).

* cited by examiner

*Primary Examiner*—Dennis H. Pedder
(74) *Attorney, Agent, or Firm*—Crowell & Moring LLP

(57) ABSTRACT

A roof arrangement for a motor vehicle having a roof frame, a sunroof, two lateral guide paths in which the sunroof is movably guided for closing or at least partially releasing a roof opening. Multiple bearing devices are connected to the sunroof, at one end in an articulated connection and at the other end supported in one of the guide paths via a guide element. The bearing devices each have a lever which is attached to both the guide element and the sunroof in a pivot bearing, whereby the pivot bearing on the sunroof end has a bearing axle which protrudes at its one end into a control path. For reliable functioning a sliding element is arranged on the end of the bearing axle which protrudes into the control path, the sliding element having an outside contour such that the sliding element rests against an edge bordering the control path in any movement position of the sliding roof.

11 Claims, 3 Drawing Sheets

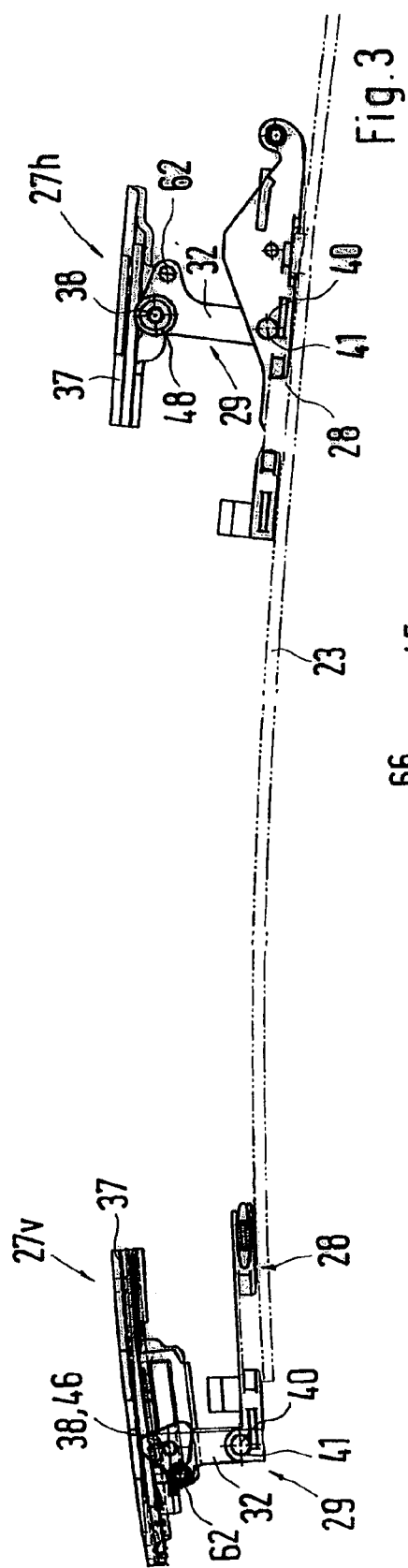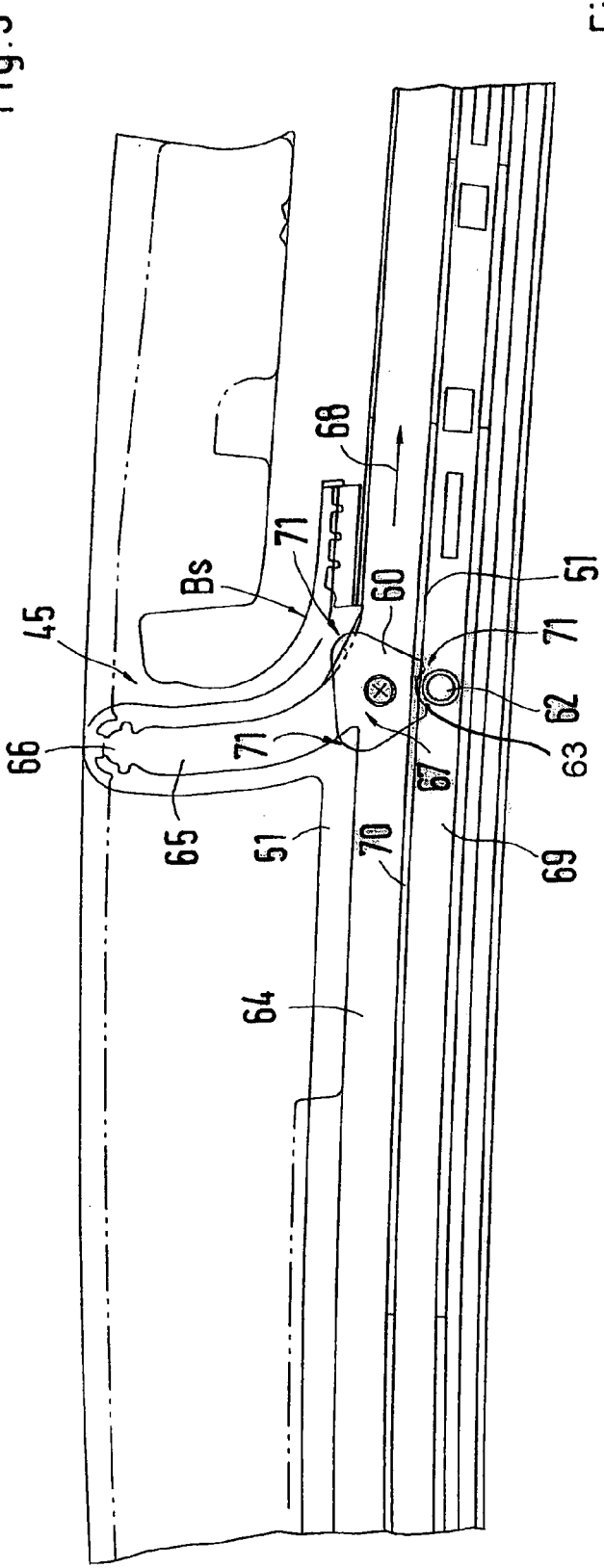

ROOF ARRANGEMENT FOR A VEHICLE

This application claims the priority of German Patent Application No. DE 10 2004 050 608.6, filed Oct. 15, 2004, the disclosure of which is expressly incorporated by reference herein.

BACKGROUND AND SUMMARY OF THE INVENTION

The invention relates to a roof arrangement for a vehicle, in particular a passage vehicle, having a displaceable sunroof.

DE 101 21 888 A1 describes a roof arrangement that defines this generic type. It has a roof frame with lateral guide paths and a sunroof which is movably guided in the guide rails for at least partially releasing or closing a roof opening. Furthermore, the roof arrangement includes bearing devices which have an articulated connection to the sunroof on one end and are supported by guide elements in the guide paths on the other end. Each bearing device has a lever which is mounted in a rotating bearing on both the sunroof end and the guide path end. The rotating bearing on the sunroof end has a bearing axle, one end of which protrudes into a lateral control path which controls the additional lifting motion of the sunroof in the traversing of the sunroof.

An object of this invention is to provide a roof arrangement in which the sunroof can be moved reliably.

This object is achieved with a roof arrangement in which a sliding element is provided on the end of a bearing axle which protrudes into the control path, said sliding element having an outside contour such that the sliding element is in contact with an edge bordering the roof control path in any movement position of the sunroof.

The advantages achieved with this invention can be regarded as the fact that due to the outside contour of the sliding element, the sliding element is prevented from being forced into the control path and becoming jammed there.

Other objects, advantages and novel features of the present invention will become apparent from the following detailed description of the invention when considered in conjunction with the accompanying drawings.

BRIEF DESCRIPTION OF THE DRAWINGS

FIG. 3 shows the front and rear bearing mechanism for a sunroof of the roof arrangement of FIG. 1.

FIG. 4 shows a control path for the lifting motion of the sunroof of FIG. 1.

DETAILED DESCRIPTION

Figure 1:
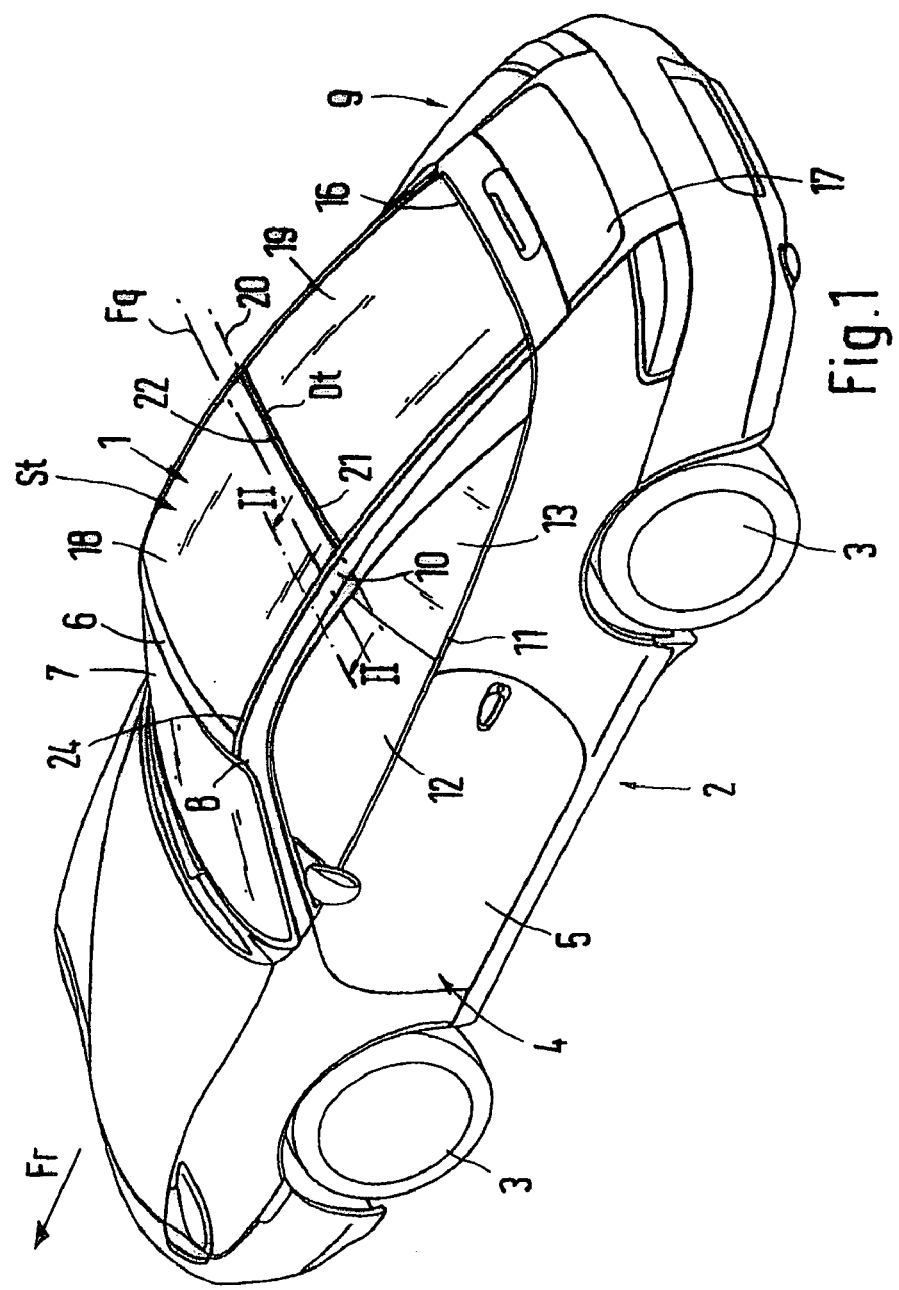
FIG. 1 shows a passenger vehicle having a roof arrangement in accordance with an embodiment of the present invention.
Figure 2:
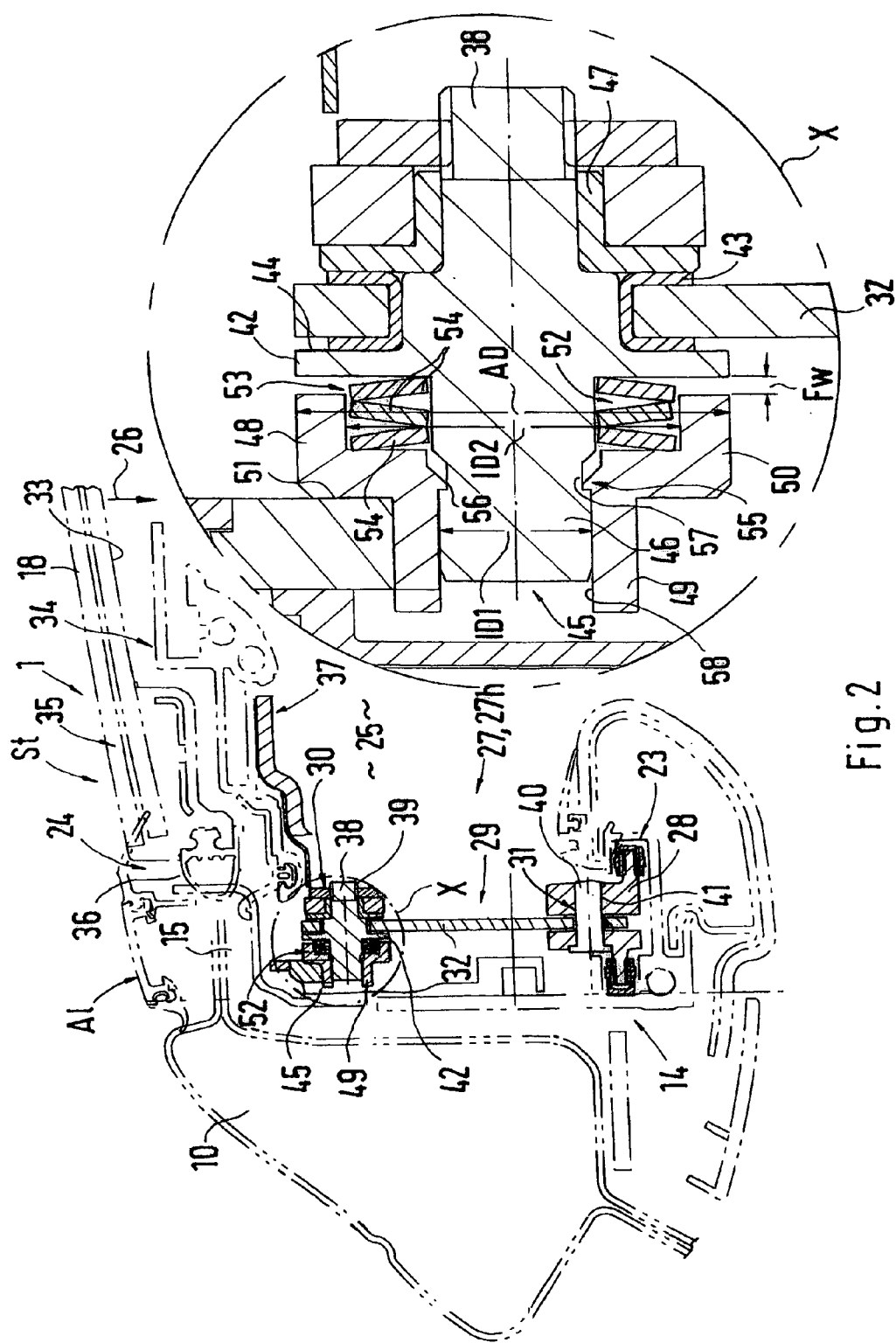
FIG. 2 shows the roof arrangement of FIG. 1 in a sectional diagram along line II—II.

A roof arrangement 1 is described on the basis of FIGS. 1, 2 and detail X in FIG. 2, this roof arrangement being provided on a motor vehicle, in particular a passenger vehicle 2 which includes a body 4 supported by wheels 3. The body 4 has a base body 5 and a windshield frame 6 into which is inserted a windshield 7. Lateral longitudinal roof bars 10 of the body 4 running approximately with a curvature extend in the direction of the rear end 9 from the upper corners 8 of the windshield frame 6 so that the body 4 has the shape of a coupe with a fastback. Side windows 12 and 13 are inserted between the lateral longitudinal roof bars 10 and the belt line 11 of the body 4 beneath that.

The roof arrangement 1 is arranged between the lateral longitudinal roof bars 10 and has—according to FIG. 2—a roof frame 14 which is connected to the body 4, e.g., by a peripheral adhesive joint 15. The roof frame 14 is preferably designed to run around the periphery and extends from the windshield frame 6 to a front edge area 16 in front of an engine space access panel 17. However, it would also be conceivable for the longitudinal roof bars 10 to form the roof frame.

The roof arrangement 1 has at least one front (as seen in the direction of travel Fr) displaceable sunroof 18 which may be rigid in design and which is adjacent to the windshield frame 6 and a rear roof part 19 (in the closed position St) which is preferably attached undisplaceably to the body 4 and/or the roof frame 14. In a preferred embodiment, the rear roof part 19 of the roof arrangement 1 is the rear window of the vehicle. It is possible for the rear roof part 19 to be opened about an articulated axle 20 running parallel to the transverse axis Fq of the vehicle. Preferably only one gasket Dt is provided between the rear edge 21 of the sunroof 18 and the front edge 22 of the rear roof part 19.

The sunroof 18 (preferably transparent) is guided movably in lateral guide paths 23 which may be mounted on the roof frame 14 or on the longitudinal bars 10, for closing or at least partially opening a roof opening 24 so that it can be deposited beneath the rear roof part 19. It is therefore provided that the sunroof 18 is to be lowered first in the direction of the vehicle interior space 25 in the direction of the arrow 26 and then is to be shifted to the rear beneath the roof part 19. For lowering the sunroof in the direction of the arrow 26, the sunroof 18 is supported by a plurality of bearing devices 27 in the guide paths 23, permitting a pivoting movement of the sunroof 18. Preferably two bearing devices 27 (arranged one behind the other in the direction of travel Fr) are slidingly guided in each guide path 23. Each bearing device 27 is supported at one end on the sunroof 18 and at the other end via a guide element 28 in one of the guide paths 23. Each bearing device 27 has a lever arrangement 29 which is rotatably hinge-connected to the guide element 28 and also to the sunroof 18 in a pivoting bearing and/or pivot bearing 30 and/or 31. The lever arrangement 29 includes at least one lever 32 which is pivotably mounted in the rotating bearings 30 and 31. The sunroof 28 can be lowered in the direction of the arrow 26 by the lever arrangement 29. Along the guide paths 23 it can then be moved to the rear beneath the roof part 19.

The sunroof 18 has a supporting frame 34 on its side 33 facing the vehicle interior 25 and attached to the inside 33 of the roof. The supporting frame 34 is provided in the roof edge area 35 and preferably runs completely around this roof edge area 35. A peripheral gasket 36 running around the edge of the sunroof 18 may be attached to the supporting frame 34, sealing the sunroof 18 with respect to the border of the roof opening 24. The gasket Dt may be part of the gasket 36. A covering strip A1 can span the free space between the longitudinal roof bar 10 and the sunroof 18 over the gasket 36.

The bearing device 27 has a bearing block 37 which is attached to the supporting frame 34 or is designed in one piece with it. The lever arrangement 29 is attached so that it is rotationally movable in a bearing eye 39 of the bearing block 37 with a first bearing axle 38 of the pivot bearing 30 on the sunroof end. The lever arrangement 29 is also attached so that it is rotationally movable with a second bearing axle 40 in a bearing eye 41 of the pivot bearing 31 on the guide path end. The bearing axles 38 and 40 run parallel to the transverse axis Fq of the vehicle. The lever arrangement 29 is also connected to the sunroof 18 as well as the guide element 28 so that it is pivotably movable. The bearing axle 38 has a disk 42 optionally designed in one piece with it and arranged approximately in the center. A ring element 43 having a U-shaped cross section is also arranged between the bearing axle 38 and the bearing eye 39 of the lever 32 and the disk 42 may be in contact with the ring element on one end 44.

A control path 45 is provided on the side of the roof frame 14 for control of the lifting motion in the direction of the arrow 26 and conversely the sunroof 18; a bolt section 46 of the bearing axle 38 protrudes into this control path. The bolt section 46 and the first bearing axle 38 are preferably designed in one piece and pass through the lever 32. The bolt 46 and/or the bearing axle 38 are held so they are rotationally movable in the bearing eye 39, preferably with the insertion of a bearing sleeve in between, in particular a sliding sleeve 47. Furthermore a stepped bearing sleeve 48, preferably made of a friction-bearing material, is arranged on the end of the bolt 46 that protrudes into the control path 45. The bearing sleeve 48 also has a ring collar 50 in addition to the sleeve section 49 protruding into the control path 45, said ring collar being designed with a larger outside diameter AD in comparison with the sleeve section 49 so that, as mentioned above, the bearing sleeve 48 is designed as a stepped sleeve. The ring collar 50 is adjacent to the disk 42. The outside diameter AD of the ring collar 50 is designed so that the ring collar 50 is in contact with an edge 51 bordering the control path 45 in at least some areas in each movement position of the sunroof 18. It is also provided that a spring mechanism 52 pressing the bearing sleeve in the direction of the control path 45 is to be arranged between the bearing sleeve 48 and the lever 32, in particular the disk 42. The ring collar 50 which is designed accordingly in its outside diameter AD prevents the bearing sleeve 48 from being forced completely into the control path 45 by the force applied by the spring mechanism 52 and possibly being jammed there. In addition, the sunroof 18 is also secured between the lateral control paths 45 by the force applied by the spring mechanism 52 in the transverse direction Fq of the vehicle, so that it is held securely in the roof opening 24 in particular in its closed position St and thus contributes to minimization of noise. The spring mechanism 52 is under prestress in the direction of the transverse axle Fq of the vehicle so that the bearing sleeve 48 is pressed with a corresponding prestressing force against the edge 51. The spring mechanism 52 is preferably formed by a plate spring package 53 having a plurality of plate springs 54, e.g., made of steel. The plate springs 54 are arranged with their curvatures in alternation. The plate springs 54, which are designed as rings, are arranged on the bolt 46 between the bearing sleeve 48 and the lever 32 and/or the disk 42.

The bearing sleeve 48 has a different inside diameter ID1 and ID2 in the sleeve section 49 and in the ring collar 50, with the inside diameter ID1 being smaller than the inside diameter ID2 and also being adapted to the outside diameter of the bolt 46. Due to the larger inside diameter ID2 in the ring collar 50, the spring mechanism 52 may be accommodated there at least partially. The outside diameter of the plate springs 54 is also smaller than the inside diameter ID2.

For simple assembly of the spring mechanism 52 and the bearing sleeve 48, a snap device and/or a catch mechanism 55 is provided between the bolt 46 and the bearing sleeve 48, holding the bearing sleeve 48 on the bolt with a catch connection. The bolt may have a notch 56 for the catch mechanism 55, a nose 57 engaging in the notch, protruding on the inside 58 of the bearing sleeve 48 and thus belonging to the catch mechanism 55. The nose 57 and/or the notch 56 may be designed to run around the perimeter or be provided just in sections.

A spring path Fw between the bearing sleeve 48 and the disk 42 and/or the lever 32 is also provided due to the position of the catch mechanism 55, this spring path being measured between an end face 59 of the ring collar 50 and the disk 42. The spring path Fw is preferably of such dimensions that the spring mechanism 52 cannot be overloaded and/or "blocked" so that a spring force limit is reached by the spring path Fw when the end face 59 is in contact with disk 42. If no disk 42 is used, then the preceding discussion for the lever also applies here, with the spring mechanism 52 then being supported on the lever. However, a separation between the spring mechanism 52 and the lever is achieved by the disk 42 and the ring element 43 so that the lever 32 can be rotated about the bearing axle 38 without any great resistance. Moreover, the spring mechanism 52 is under prestress, so that the resulting spring force still allows the bearing sleeve 48 to slide and/or rotate in the control path 45 and/or on the edge 51.

FIG. 3 shows two bearing mechanisms 27. A rear bearing mechanism 27h is designed as described above. A front bearing mechanism 27v for the sunroof 18 (not shown in FIG. 3) is explained below, where differences in comparison with the rear bearing mechanism 27h are described in particular. The same parts of the front and rear bearing mechanisms and/or those having the same effect are labeled with the same reference notation. A sliding element 60 is arranged on the end of the bearing axle 38 protruding into the control path 45, so that it is rotatable in particular and is made of a friction bearing material such as plastic. It is possible to provide for a bearing sleeve 48 to be arranged on the end of the bearing axle 48—as described in conjunction with the rear bearing mechanism 27h, the sliding element 60 being attached to the sleeve section 49 of said bearing sleeve. The bearing sleeve 48 may be acted upon by force via the spring mechanism 52. However, as an alternative it would also be conceivable for the sliding element 60 to be placed directly on the bearing axle 38. Again in this embodiment, the spring mechanism 52 may be provided, but then it acts directly on the sliding element 60, pressing it against the edge 51 of the control path 45. The sliding element 60 has an outside contour 61 which may be triangular, but in particular is designed so that it rests in at least some sections on the edge 51 in any movement position Bs (FIG. 4) of the sunroof 18 so that it cannot be forced into the control path 45 where it could become jammed.

A control extension 62 which engages in the control path 45 may be [mounted] on an extension of the lever 32 on the front and/or rear bearing mechanisms 27v, 27h. The sliding element 60 may have a corresponding cutout 63 in which the control extension 62 is situated.

FIG. 4 shows the control path 45 in a side view. It has a longitudinal control section 64 and at least one lifting control section 65. The upper end 66 of the lifting control section 65 is assigned to the closed position St of the sunroof 18 in which end 66 the bearing axle 38 is situated in the closed position St of the sunroof 18. The detail of the control path 45 shown in FIG. 4 is provided for the rear bearing mechanism 27h. The longitudinal control section 64 leads from its intersection 67 with the lifting control section 65 in the direction of the arrow 68 further to a lifting control section (not shown here) which is provided for the front bearing mechanism 27v. For the sake of simplicity, FIG. 4 shows only the sliding element 60 and the control extension 62 which are situated in the area of the intersection 67 in the movement position Bs (shown in FIG. 4) of the sunroof 18 which corresponds to an at least partially open position of the sunroof 18. The outside contour 61 of the sliding element 60 prevents it from being forced into the control path 45 so that jamming of the sliding element 60 therein is prevented. In this movement position Bs, the control extension 62 is in a separate section 69 of the control path 45 which is separated from the longitudinal control section 64 by a control wall 70. It can be seen here that the sliding element 60 is supported on the edge 51 in at least three points 71.

What is claimed is:

1. A roof arrangement for a motor vehicle, comprising:
   a roof frame;
   a sunroof;
   two lateral guide paths in which the sunroof is displaceably guided; and
   a plurality of bearing devices connected to the sunroof, wherein
   each bearing device is connected to the sunroof by an articulated connection at one end with the sunroof, and at an opposite end supported via a guide element in one of the guide paths,
   each bearing device has a lever attached to both the guide element and the sunroof in a rotating bearing, the rotating bearing having a bearing axle on a sunroof end which protrudes into a control path arranged to provide a lifting motion of the sunroof, the bearing axle being provided with a stepped bearing sleeve, and
   a sliding element is provided on the end of the bearing axle which protrudes into the control path, said sliding element having an outside contour such that the sliding element is in contact with an edge bordering the control path in any movement position of the sunroof.

2. The roof arrangement as claimed in claim 1, wherein the sliding element is pressed by a spring mechanism against the edge of the control path.

3. The roof arrangement as claimed in claim 2, wherein the spring mechanism is under a pre-stress.

4. The roof arrangement as claimed in claim 1, wherein the outside contour of the sliding element is triangular.

5. The roof arrangement as claimed in claim 1, wherein the lever has a control extension which protrudes into the control path.

6. The roof arrangement as claimed in claim 5, wherein the sliding element has a cutout in which the control extension is arranged.

7. The roof arrangement as claimed in claim 1, wherein the sliding element is made of a low-friction bearing material.

8. The roof arrangement as claimed in claim 1, wherein the bearing axle on the sunroof end extends on both sides of the lever and protrudes on its end facing away from the bearing block into the control path which controls the lifting movement of the sunroof.

9. The roof arrangement as claimed in claim 1, wherein the sunroof is supported laterally in the guide paths by a front bearing mechanism and a rear bearing mechanism.

10. Roof arrangement as claimed in claim 9, characterized in that the front bearing mechanism (27v) is equipped with the sliding element (60).

11. The roof arrangement as claimed in claim 10, wherein the rear bearing mechanism is equipped with the stepped bearing sleeve which is pressed by a spring mechanism against the edge of the control path.

* * * * *